United States Patent [19]

Senters

[11] Patent Number: 5,271,115
[45] Date of Patent: Dec. 21, 1993

[54] BRAKE SLACK ADJUSTER AND TIRE TESTER TOOL

[76] Inventor: Richard A. Senters, 216 S. Chestnut, Beloit, Kans. 67420

[21] Appl. No.: 762,478

[22] Filed: Sep. 19, 1991

[51] Int. Cl.⁵ .............................................. B25F 1/00
[52] U.S. Cl. ........................................... 7/100; 7/143; 81/484; 81/176.2
[58] Field of Search ................... 81/484, 488, 176.1, 81/176.2, 176.3; 7/100, 170, 143; 254/131; 29/267

[56] References Cited

U.S. PATENT DOCUMENTS

| | | | |
|---|---|---|---|
| 1,291,633 | 1/1919 | Allmon | 81/176.2 |
| 1,366,923 | 2/1921 | Newton | 81/176.2 |
| 1,372,389 | 3/1921 | Bailey et al. | 81/176.3 |
| 1,753,545 | 4/1930 | Altice et al. | 81/484 |
| 3,843,981 | 10/1974 | Verest | 7/170 |
| 4,050,107 | 9/1977 | Parma | 7/100 |
| 4,211,446 | 7/1980 | Shultz, Sr. | 254/131 |
| 4,550,460 | 11/1985 | Smallbrook | 7/164 |
| 4,572,040 | 2/1986 | Metz | 81/463 |
| 4,625,353 | 12/1986 | Tamez et al. | 7/100 |
| 4,685,164 | 8/1987 | Sebalos | 7/100 |
| 4,715,252 | 12/1987 | Pella | 81/176.1 |
| 4,864,900 | 9/1989 | Kreikle | 7/100 |
| 4,870,737 | 10/1989 | Navarro | 29/267 |

Primary Examiner—Roscoe V. Parker
Attorney, Agent, or Firm—Phillip A. Rein

[57] ABSTRACT

A brake slack adjuster and tire tester tool including a main support assembly having mounted thereon a connector hook assembly and, on an outer end, an arm connector and tire tester assembly. The tool support assembly has a main handle assembly having on one end a hand gripper assembly which is operable to be grasped by the user thereof. The connector hook assembly is provided with a main hook member secured to an outer portion of the main handle member and operable to grasp onto a portion of a rocker arm assembly of an air brake assembly on a truck/trailer assembly. The arm connector and tire tester assembly is provided with a tire tester section and an arm connector section. The tire tester section is operable for impacting an outer surface of a tire member to check the condition thereof. The arm connector section is operable to contact and grasp a portion of the rocker arm assembly of the air brake assembly and cooperates with the connector hook assembly for ease of pivotal movement of the rocker arm assembly for testing slack in the air brake assembly.

5 Claims, 2 Drawing Sheets

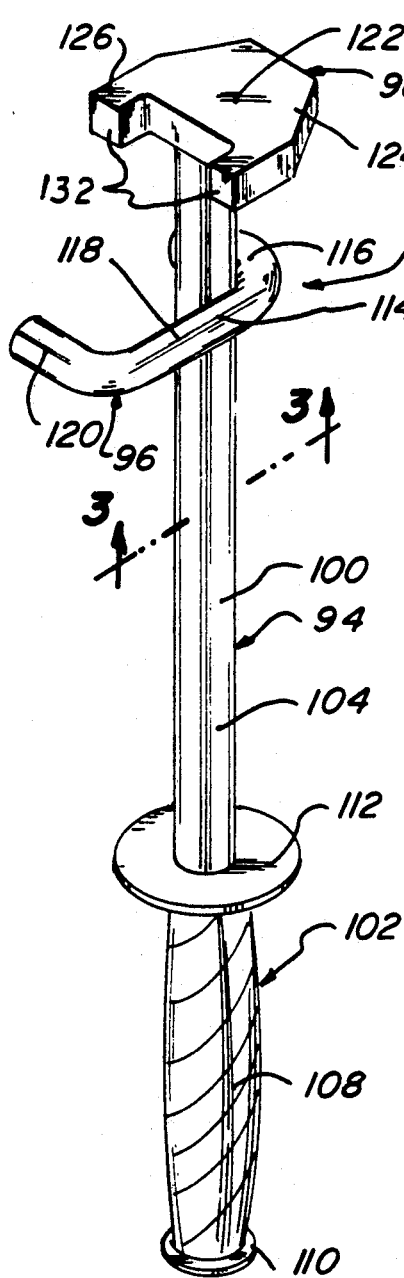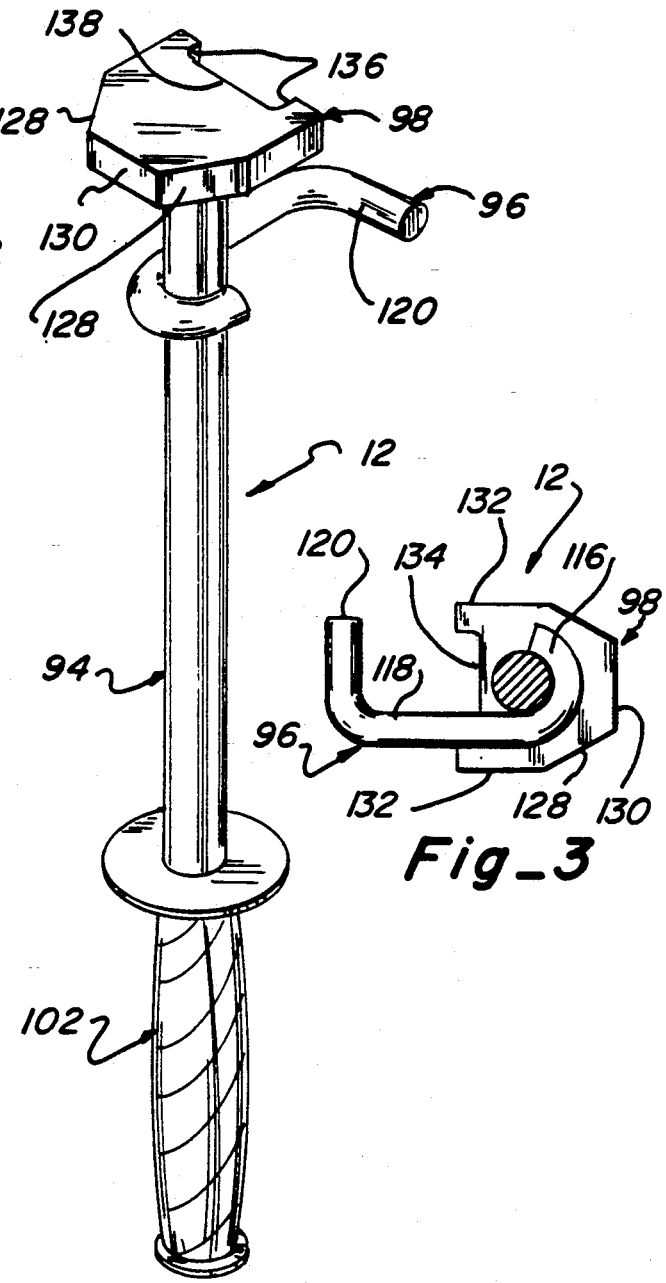
Fig_1  Fig_2  Fig_3

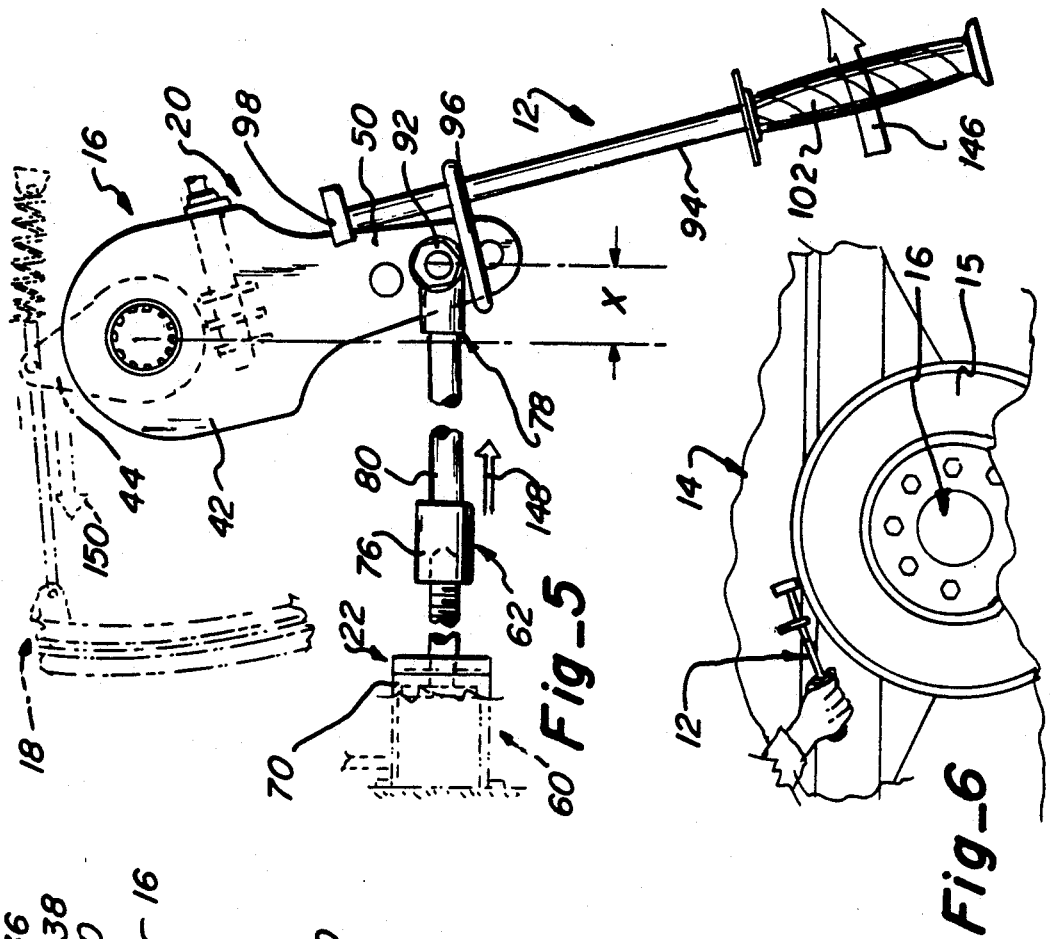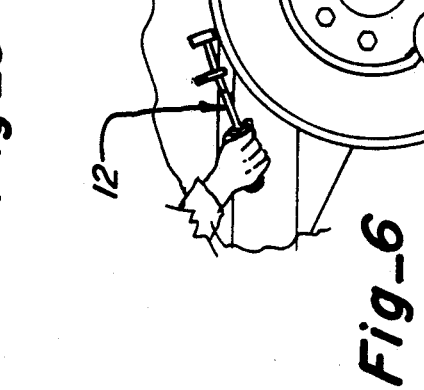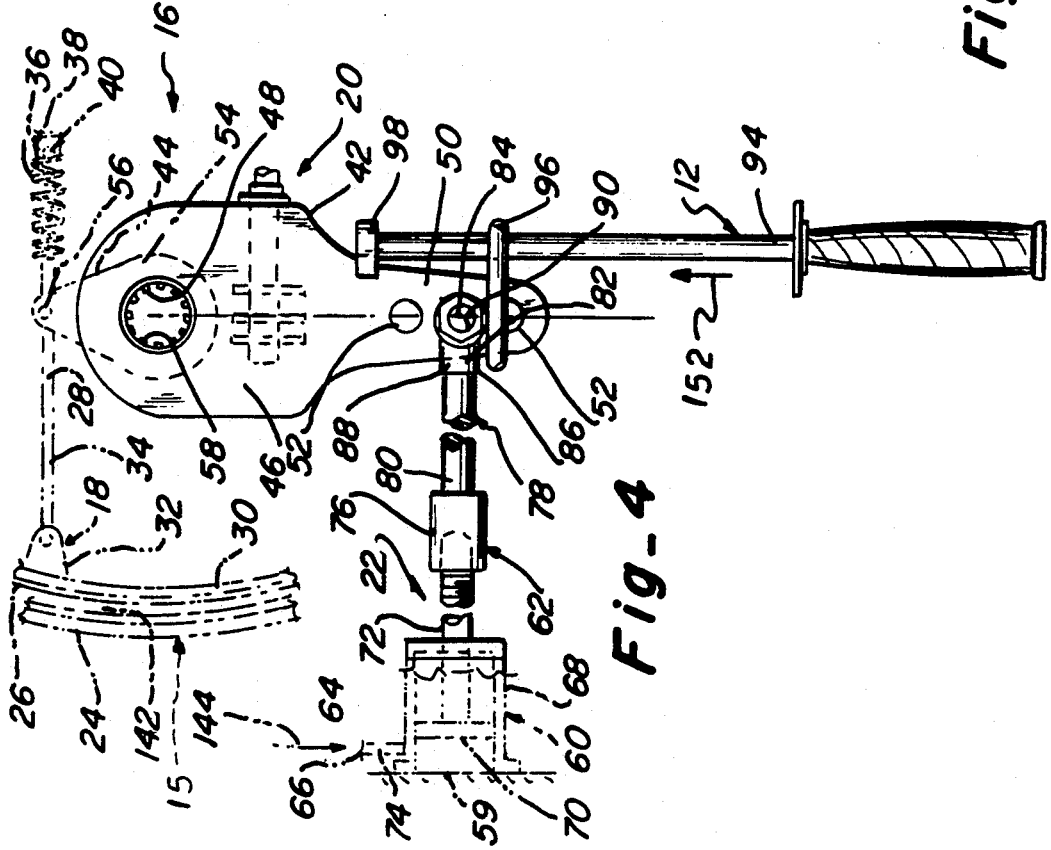

BRAKE SLACK ADJUSTER AND TIRE TESTER TOOL

PRIOR ART

A patent search was conducted on this invention and revealed the following United States patents:

| U.S. Pat. No. | Invention | Inventor |
|---|---|---|
| 1,291,633 | WRENCH | Joseph G. Allmon |
| 3,843,981 | TOOL | Ralph W. Verest |
| 4,050,107 | TOOL FOR TRUCK OPERATORS | John N. Parma |
| 4,572,040 | BRAKE ADJUSTMENT TOOL | Delano L. Metz |
| 4,625,358 | BRAKE ADJUSTMENT TOOL | Tamez et al |
| 4,685,164 | AIR BRAKE ADJUSTMENT TOOL | Adam Sebalos |
| 4,715,252 | VALVE WRENCH | Amy Pella |
| 4,864,900 | TESTING AND ADJUSTING TOOL FOR AIR BRAKE CAMS | Kreikle et al |

The Allmon patent discloses a tool member having cooperating surfaces and protrusions thereon operable to cooperate to remove a flange member in a plumbing application as noted in FIG. 2.

The Verest patent discloses a load binder handle for use as a tool for truckers.

The Parma patent discloses a tool for truck operators which is utilized for many purposes such as releasing a fifth wheel and checking depth of fuel in a fuel tank.

The Metz and Kreikle et al patients disclose brake adjusting and testing tools for checking the brake adjustments on large trucks and trailers.

The Kreikle et al patent discloses an elongated tool which is grasped by a handle to move an actuator arm to check movement of a shaft connected to an actuating lever on an air brake system.

The Metz patent teaches a handle for use in checking tire pressure and a slack adjuster.

The Tamez et al patent discloses a brake adjustment tool for grasping about an actuator arm in a brake mechanism.

The Sebalos patent discloses a brake adjustment tool for adjusting air brakes on automotive vehicles.

The Pella patent discloses a tool with a rounded head to be used by truckers to aid in rotation of a turn wheel on valves.

PREFERRED EMBODIMENT OF THE INVENTION

In one preferred embodiment of this invention, a brake slack adjuster and tire tester tool is operable on a truck/trailer assembly in order to 1) check an air brake assembly to ascertain slack within a rocker arm assembly for safety purposes; and 2) to check the presence of air pressure within tire members on the truck/trailer assembly.

The brake slack adjuster and tire tester tool includes 1) a tool support assembly; 2) a connector hook assembly connected to an outer portion of the tool support assembly; and 3) an arm connector and tire tester assembly secured to an outer end of the tool support assembly.

The tool support assembly includes a main handle member having a hand gripper assembly connected to one end thereof. The main handle member is provided with a cylindrical body member resembling a shaft structure. The hand gripper assembly includes a grip member secured to an outer end of the cylindrical body member having an arcuate body portion with an end connector portion on one end and a hand shield portion on another.

The arcuate body portion is similar to a bicycle handle bar grip constructed and shaped for easy grasping by a user's hand thereon. The hand shield portion provides for protection to the forefinger and thumb of the user thereof during a testing usage operation.

The connector hook assembly is of a cylindrical shape in transverse cross section having 1) an arcuate connector section secured to the cylindrical body member; 2) a central body section integral with an outer end of the arcuate connector section; and 3) an outer actuator section integral with an outer end of the central body section.

The outer actuator section is positioned at a 90 degree angle to a longitudinal axis of the central body section. All of the subject sections of the connector hook assembly have respective longitudinal axes thereof aligned in a common plane extending substantially perpendicular to a longitudinal axis of the main handle member.

The arm connector and tire tester assembly is constructed of a plate metal material extended in a plane perpendicular to the longitudinal axis of the main handle member. More particularly, the arm connector and tire tester assembly include a central body section having therewith an integral tire tester section and an arm connector section.

The tire tester section is provided with inclined side walls integral with an outer impact section. The outer impact section is operable to impact tire members on the truck/trailer assembly to ascertain whether they have sufficient air pressure and/or in a deflated condition.

The arm connector section is provided with spaced parallel inclined side walls defining a connector slot therebetween. The connector slot is provided with side wall sections integral with a back wall section and being of generally U-shape.

The brake slack adjuster and tire tester tool is used by an operator grasping the grip member of the tool support assembly and placing the connector hook assembly about a portion of a rocker arm of an air brake assembly. The arm connector section of the arm connector and tire tester assembly is placed against another portion of the rocker arm assembly of the air brake assembly.

A leverage is obtained by interconnection of the connector hook assembly and the arm connector and tire tester assembly so that the operator can move the hand gripper assembly laterally which, in turn, pivots the rocker arm assembly of the air brake assembly and other interconnected structures so as to measure slack in an air brake system to determine whether repair and/or adjustment thereof is required.

OBJECTS OF THE INVENTION

One object of this invention is to provide a brake slack adjuster and tire tester tool achieving dual functions of 1) testing slack within an air brake assembly on a truck/trailer assembly for meeting federal and state vehicle inspection requirements; and 2) providing a tire tester tool operable to test whether a tire member on the truck/trailer assembly is flat or of low pressure requiring maintenance.

Another object of this invention is to provide a brake slack adjuster and tire tester tool having thereon a tool support assembly to be grasped by a user thereof and having mounted thereon a connector tool assembly and an arm connector and tire tester assembly which are operable to be interconnected to a rocker arm assembly on an air brake assembly in order to pivot the rocker arm assembly to ascertain the amount of brake slack for safety reasons.

One other object of this invention is to provide a brake slack adjuster and tire tester tool having a tool support assembly with a connector hook assembly and an arm connector and tire tester assembly mounted thereon which is easily grasped by an operator for releasable connection to a rocker arm assembly on an air brake assembly of a truck/trailer assembly for checking brake slack in an easy, convenient manner in order to comply with federal and state vehicle safety requirements.

One further object of this invention is to provide a brake slack adjuster and tire tester tool having a tire tester section connected to an outer end of a tool support assembly which is operable to impact an outer surface of a tire member to check the condition thereof.

Still, one other object of this invention is to provide a brake slack adjuster and tire tester tool which is simple in construction; economical to manufacture; easy to use; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a perspective view of the brake slack adjuster and tire tester tool of this invention;

FIG. 2 is a perspective view similar to FIG. 1 having the brake slack adjuster and tire tester tool rotated 180 degrees;

FIG. 3 is a sectional view taken along line 3—3 in FIG. 1;

FIG. 4 is a side elevational view of the brake slack adjuster and tire tester tool of this invention illustrating attachment to a rocker arm assembly in an air brake assembly normally found on a truck/trailer wheel assembly;

FIG. 5 is a view similar to FIG. 4 illustrating a method step on pivoting the rocker arm assembly to measure slack within the air brake assembly; and FIG. 6 is a schematic fragmentary side elevational view of a wheel assembly on a truck/trailer assembly with an operator utilizing the brake slack adjuster and tire tester tool to check condition of the tire member.

The following is a discussion and description of preferred specific embodiments of the brake slack adjuster and tire tester tool of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, in particular to FIG. 6, a brake slack adjuster and tire tester tool of this invention, indicated generally at 12, is operable to be used on a truck/trailer assembly 14 having rotatable wheel members 15 which are braked through an air brake assembly 16 for a normal braking operation.

As noted in FIG. 4, the air brake assembly 16 includes 1) a brake shoe assembly 18 mounted within the respective wheel member 15; 20 a rocker arm assembly 20 operably connected to the brake shoe assembly 18 for actuation thereof; and 3) an air actuator assembly 22 operable under air pressure to rotate the rocker arm assembly 20 which, in turn, activates a braking operation on movement of the brake shoe assembly 18.

The brake shoe assembly 18 includes 1) a wheel drum member 24 which supports an outer rotatable wheel member 15; 2) a brake shoe member 26 which is movable outwardly to contact the wheel drum member 24 during a braking operation; and 3) a brake actuator arm assembly 28 interconnected between the brake shoe member 26 and the rocker arm assembly 20. The brake shoe member 26 includes a brake member 30 having a connector lug member 32 thereon.

The brake actuator arm assembly 28 includes a connector rod member 34 having one end connected to the connector lug member 32 and the other end connected to a bias assembly 36 and the rocker arm assembly 20.

The bias assembly 36 includes 1) a spring member 38 having one end connected to a common connection of the connector rod member 34 and the rocker arm assembly 20; and 2) an outer end connected to an anchor lug 40 which is secured to a non-movable portion of the air brake assembly 16.

The rocker arm assembly 20 has a primary rocker arm member 42 connected to a secondary rocker arm member 44. The primary rocker arm member 42 includes a main arm body 46 having a shaft opening 48 and a connector section 50. The connector section 50 is of a tapered shape having spaced thereon a plurality, namely three, of adjustment holes 52.

The secondary rocker arm member 44 includes an arm body section 51 which is connected to the main arm body 46 and having a rod connector hole 56 and a shaft connector hole 58. The rod connector hole 56 is connected to the inner end of the connector rod 34 and an outer end of the spring member 38 as noted in FIG. 4.

The shaft connector hole 56 and the shaft opening 48 are shown as having a spline connector portion thereon for conjoint rotation about the central axis of a shaft member.

The operation thereof is such that rotational movement of the primary rocker arm member 42 is operable to conjointly rotate the secondary rocker arm member 44 for movement of the brake shoe member 26 against the wheel drum member 24 in a conventional air brake operation.

The air actuator assembly 22 is connected to a support wall 59 and, additionally, to the connector section 50 of the primary rocker arm member 42 for movement thereof under air pressure on actuation of a brake pedal by a truck/trailer operator.

The air actuator assembly 22 includes an arm actuator assembly 60 connected to the support wall 59 and connected to an arm connector assembly 62 which, in turn, is connected to the primary rocker arm member 42.

The arm actuator assembly 22 includes a piston and cylinder assembly 64 which is engaged and operable through connection through a fluid actuator source 66 to supply air pressure on actuation of a brake pedal or lever.

The piston and cylinder assembly 64 includes a cylinder member 68 having a reciprocal piston member 70 mounted therein. The piston member 70 has a piston rod 72 which is connected to the arm connector assembly 62 for conjoint movement thereof as will be noted.

The piston member 70 is selectively movable under air pressure received from the fluid actuator source 66 having an inlet line 74 through which air pressure is applied for movement to an extended position as noted in FIG. 5.

The piston member 70 is moved to a non-breaking or inactive position due to the action of the bias assembly 36 to the position as noted in FIG. 4.

The arm connector assembly 62 includes a piston rod connector 76 having one end connected to an outer threaded end of the piston rod 72 and an opposite end connected to an adjustment assembly 78 which, in turn, is connected to the connector section 50 of the primary rocker arm member 42. The piston rod connector 76 has internal threads for adjustable connection to the piston rod 72.

The adjustment assembly 78 includes 1) an adjustment rod 80 connected to the piston rod connector 76; 2) a connector head member 82 on an outer end of the adjustment rod 80; and 3) an anchor member 84 connecting the connector head member 82 to the connector section 50 of the primary rocker arm member 42.

The adjustment rod 80 has a threaded end section 86 for adjustable connection to the connector head member 82.

The connector head member 82 has a connector portion 88 to receive the threaded end section 86 and an outer connector hole 90 through which the anchor member 84 is mounted.

The anchor member 84 is a nut and bolt member 92 which is extended through a selected one of the adjustment holes 52 in the primary rocker arm member 42 for secure fastening thereto. The anchor member 84 permits rotational, pivotal movement of the primary rocker arm member 42 from the condition of FIG. 4 to the condition of FIG. 5 for reasons to be explained.

As noted in FIG. 1, the brake slack adjuster and tire tester tool 12 includes 1) a tool support assembly 94 resembling a hammer member; 2) a connector hook assembly 96 mounted on an outer portion of the tool support assembly 94; and 3) an arm connector and tire tester assembly 98 connected to an outer end of the tool support assembly 94.

The tool support assembly 94 includes a main handle member 100 having a hand gripper assembly 102 on one outer end thereof. The main handle member 100 has a cylindrical body member 104 of circular shaft shape in transverse cross section.

The hand gripper assembly 102 has a grip member 106 formed with an arcuate body portion 108 having an end connector portion 110 on one end and a hand shield portion 112 on an opposite end thereof.

The arcuate body portion 108 may be constructed of a resilient rubber material similar to a hand grip member on a bicycle handle bar structure.

The hand shield portion 112 restricts movement of the user's hand in a forward motion while the end connector portion 110 has a similar function so as to restrain the user's hand between the hand shield portion 112 and the end connector portion 110 while being utilized as will be explained.

The connector hook assembly 96 includes a main hook member 114 being of cylindrical shape in transverse cross section and secured as by welding to an upper portion of the cylindrical body member 104.

The main hook member 114 includes 1) an arcuate connector section 116 of circular shape for wrapping around the cylindrical body member 104; 2) a central body section 118 having one end integral with an outer end portion of the arcuate connector section 116; and 3) an outer actuator section 120 integral with an outer portion of the central body section 118.

The central body section 118 provides for a proper spacing of the outer actuator section 120 which extends at a 90 degree angle to the central body section 118 and in a direction perpendicular to a longitudinal axis of the main handle member 100.

The spacing of the outer actuator section 120 from a longitudinal axis of the main handle member 100 is selected for proper operation and cooperation with the arm connector and tire tester assembly 98 as will be noted.

The arm connector and tire tester assembly 98 extends in a common plane and is constructed of a plate sheet metal material. The arm connector and tire tester assembly is secured as by welding to an outer end of the cylindrical body member 104 of the tool support assembly 94 and extends in a plane perpendicular to the longitudinal axis of the cylindrical body member 104.

More particularly, the arm connector and tire tester assembly 98 includes a central body section 122 integral with a tire tester section 124 and an arm connector section 126. The tire tester section 124 includes inclined side walls 128 integral with an outer inpact section 130. The impact section 130 is operable to contact a tire member on the wheel member 15 for an air pressure check as will be explained.

The arm connector section 126 includes parallel side wall arms 132 leading to a connector slot 134. The connector slot 134 has side wall sections 136 integral with a back wall section 138 to define a slot between the side wall arms 132 for reasons to become obvious.

USE AND OPERATION OF THE INVENTION

In the use and operation of the brake slack adjuster and tire tester tool 12 of this invention, the air brake assembly 16 on the truck/trailer assembly 14 can be of various types. The important feature is that movement of the rocker arm assembly 20 as shown by an arrow 148 in FIG. 5 by operation of the air actuator assembly 22 provides for pivotal movement of the brake shoe assembly 18 to achieve a braking operation. This is achieved by movement of the brake shoe member 26 against the wheel drum member 24 as noted by an arrow 150 in FIG. 5.

A normal operation of the air brake assembly 16 is that air pressure is applied through the fluid actuator source 66 and, more particularly, the inlet line 74 whereas the movement of the piston member 70, as noted by the arrow 148, is achieved during a braking operation.

The purpose and function of the brake slack adjuster and tire tester tool 12 is to measure slack movement of the rocker arm assembly 20 as indicated by a letter "X" as noted in FIG. 5. This slack movement indicates a spacing between the wheel drum member 24 and the non-actuated brake shoe member 26 as noted by 142 in FIG. 4. This correlates with movement of the primary rocker arm member 42 indicated by the letter "X".

The brake slack adjuster and tire tester tool 12 is to measure this slack movement indicated by the letter "X" which shall not be greater than certain standards set by state and federal vehicle regulatory agencies such as 1½ inches. If this movement indicated by the letter "X" is greater than this amount, it indicates that an adjustment must be made to the air brake assembly 16. This can be adjustment of the brake actuator arm assembly 28 to achieve brake free play movement indicated by the letter "X" into acceptable safety standards. It is important that this can be readily checked by the operator of the truck/trailer assembly 14 through the brake slack adjuster and tire tester tool 12 of this invention.

To check the air brake assembly 16, the operator takes the brake slack adjuster and tire tester tool 12 and places the arm connector section 126 of the arm connector and tire tester assembly 20 against an outer upward portion of the connector section 50 as noted in FIG. 4. This is placed on opposite sides of the primary rocker arm member 42 to engage the slot defined between the side wall arms 132 and against the back wall section 138 of the arm connector section 126. The side wall arms 132 are operable to maintain the abutting portion of the primary rocker arm member 42 between the side wall arms 132.

The operator then moves the tool support assembly 94 inwardly as noted by an arrow 152 to reach the condition as shown in FIG. 4.

On reaching the condition of FIG. 4, the operator can then, through grasping of the hand gripper assembly 102, pivot the entire brake slack adjuster and tire tester tool 12 as noted by an arrow 146 in FIG. 5. This movement will then reveal a slack within the rocker arm assembly 20 as shown by the letter "X".

If this movement indicated by the letter "X" is within acceptable standards, such as less than 1½ inch movement, this indicates that the air brake assembly 16 is in satisfactory condition and does not require an adjustment.

If an adjustment is required, this procedure is well known in the prior art and the operator can then adjust same to be within required safety standards.

This procedure is repeated by the operator to check all of the air brake assemblies 16 on the truck/trailer assembly 14 by repeating the aforementioned steps.

The brake slack adjuster and tire tester tool 12 further serves as a means for testing air pressure within the tire member on the wheel member 15 as noted in FIG. 6. The operator utilizes the tool support assembly 94 similar to a hammer member by impacting an outer surface of the tire member by the outer impact section 130. The amount of tension and bouncing thereupon indicates whether the tire member is in a low air pressure or deflated condition and needs maintenance.

Due to dual wheels on a rotatable axis of the wheel member 15, a truck/trailer assembly 14 can have a flat tire and the condition will not be visibly noted due to an adjacent wheel member 15 providing support on a ground surface. Therefore, the tire tester section 124 is important to the operator of the truck/trailer assembly 14 for checking air pressure conditions of the tire member on the wheel member 15.

It is noted that the brake slack adjuster and tire tester tool 12 achieves a dual function of checking the condition of the air brake assembly 16 on each wheel member 15 and, additionally, the pressure of the tire member mounted thereon.

The brake slack adjuster and tire tester tool provides a dual purpose tool which is sturdy in construction; economical to manufacture; easy to use; and substantially maintenance free.

While the invention has been described in conjunction with preferred specific embodiments thereof, it will be understood this description is intended to illustrate and not to limit the scope of the invention, which is defined by the following claims:

I claim:

1. A brake slack adjuster and tire tester tool used to check slack in an air brake assembly and tire pressure on a truck/trailer assembly, comprising:
    a) a tool support assembly having an elongated handle member;
    b) a connector hook assembly secured to said tool support assembly having a main hook member with an outer actuator section;
    c) an arm connector and tire tester assembly secured to said tool support assembly in cooperating relationship to said connector hook assembly;
    d) said connector hook assembly having said main hook member with an arcuate connector section rigidly secured to said tool support assembly for non-movement relative thereto, a central body section having one end connected to said arcuate connector section, and said outer actuator section connected to another end of said central body section operable to contact and engage the rocker arm assembly for applying force thereagainst and movement thereof to measure slack within the air brake assembly;
    e) said outer actuator assembly extended laterally and perpendicular to said central body section for engagement with the rocker arm assembly; and
    f) said outer actuator assembly extended perpendicular to a longitudinal axis of said tool support assembly;

whereby said connector hook assembly and said arm connector and tire tester assembly are engagable with a rocker arm assembly on the air brake assembly to pivot the rocker arm assembly to measure slack therein for vehicle safety purposes.

2. A brake slack adjuster and tire tester tool as described in claim 1, wherein:
    a) said arm connector and tire tester assembly includes a central body section and an arm connector section integral therewith;
    b) said arm connector section having spaced, parallel side wall arms defining a U-shaped connector slot therebetween engagable with the rocker arm assembly and cooperating with said connector hook assembly for applying pressure on the rocker arm assembly to cause pivotal movement thereof to check slack therein;
    c) said connector slot having spaced parallel side walls interconnected by a back wall extended perpendicular to said side walls; and
    d) said back wall extended in a plane parallel to a longitudinal axis of said handle member.

3. A brake slack adjuster and tire tester tool operable to engage and pivot a rocker arm assembly in an air brake assembly on a truck/trailer assembly to periodically measure slack in the rocker arm assembly for a road safety check, comprising:
    a) a tool support assembly having a main handle member having an elongated body member of circular shape in transverse cross section operable to be grasped on one end by a user thereof;
    b) a connector hook assembly connected to another end portion of said body member operable to engage one side of the rocker arm assembly;

c) an arm connector and tire tester assembly connected to an outer end of said main handle member operable to engage another side of the rocker arm assembly;

d) said connector hook assembly having a main hook body with a connector section rigidly secured to said main handle member for non-movement relative thereto, a central body section connected to said connector section and extended laterally of said main handle member, and an outer actuator section secured to an outer end of said central body section and extended laterally therefrom;

e) said outer actuator section extended perpendicular to a longitudinal axis of said central body section;

f) said arcuate connector section, said central body section, and said outer actuator section all extending in a common plane; and g) said common plane perpendicular to a longitudinal axis of said body member of said main handle member and operable to grasp a portion of the rocker arm assembly to apply pressure for pivotal movement thereof;

whereby said connector hook assembly and said arm connector and tire tester assembly are engagable with the rocker arm assembly and moved by the user to ascertain slack in the air brake assembly for safety reasons and as required by state and federal trucking regulations.

4. A brake slack adjuster and tire tester tool as described in claim 3, wherein:

a) said arm connector and tire tester assembly includes a central body section having integral therewith a tire tester section and an arm connector section;

b) said arm connector section having spaced, parallel side wall arms defining a connector slot engagable with a portion of the rocker arm assembly and cooperating with said connector hook assembly so, that on lateral movement of the main handle member, the rocker arm assembly is moved to measure slack within the air brake assembly;

c) said connector slot having a back wall section perpendicular to said side wall arms; and d) said back wall section extended in a plane parallel to planes through a longitudinal axis of said outer actuator assembly and a plane parallel to a longitudinal axis of said body member of said main handle member engagable against the rocker arm assembly for retaining same therebetween due to contact with the parallel spaced said side wall arms.

5. A brake slack adjuster and tire tester tool as described in claim 3, wherein:

a) said tire tester section of substantial weight and rigidity having inclined side walls integral with an outer impact wall; and b) said impact wall extended laterally and in a plane parallel to a longitudinal axis of said body member of said handle member and a longitudinal axis of said outer actuator section;

whereby said impact wall is used to strike a tire member and determine whether air pressure therein is sufficient due to both sound emitted force of rebound of the tire member.

* * * * *